United States Patent
Hisaeda

Patent Number: 5,735,923
Date of Patent: Apr. 7, 1998

[54] METHOD OF AND APPARATUS FOR COOLING AND TEMPERING A GLASS PLATE

[75] Inventor: Katsumi Hisaeda, Taketoyo-machi, Japan

[73] Assignee: Asahi Glass Company Ltd., Tokyo, Japan

[21] Appl. No.: 838,323

[22] Filed: Apr. 8, 1997

Related U.S. Application Data

[63] Continuation of Ser. No. 282,432, Jul. 29, 1994, abandoned.

[30] Foreign Application Priority Data

Jul. 30, 1993 [JP] Japan ................... 5-208399

[51] Int. Cl.$^6$ ................... C03B 23/02
[52] U.S. Cl. ................... 65/104; 65/114; 65/115; 65/287; 65/290; 65/291; 65/351
[58] Field of Search ................... 65/106, 104, 114, 65/107, 115, 273, 287, 288, 289, 290, 291, 348, 349, 350, 351

[56] References Cited

U.S. PATENT DOCUMENTS

| | | | |
|---|---|---|---|
| 3,717,449 | 2/1973 | Seymour | 65/104 X |
| 4,004,901 | 1/1977 | Starr | 65/104 X |
| 4,111,676 | 9/1978 | Mechling et al. | 65/104 X |
| 4,402,723 | 9/1983 | Schultz | 65/104 X |
| 4,433,993 | 2/1984 | Frank | 65/104 |
| 4,661,141 | 4/1987 | Nitschke et al. | 65/273 |
| 4,767,434 | 8/1988 | Schwartz et al. | 65/104 X |
| 4,830,649 | 5/1989 | Freidel et al. | 65/104 X |
| 4,883,526 | 11/1989 | Enk et al. | 65/287 X |
| 5,135,558 | 8/1992 | Peticollin et al. | 65/287 X |
| 5,318,615 | 6/1994 | Nagai et al. | 65/104 |
| 5,320,661 | 6/1994 | Fecik et al. | 65/104 |
| 5,330,550 | 7/1994 | Kuster et al. | 65/289 X |
| 5,352,263 | 10/1994 | Kuster et al. | 65/104 X |

FOREIGN PATENT DOCUMENTS

| | | |
|---|---|---|
| 57-145041 | 9/1982 | Japan . |
| 62-157939 | 10/1987 | Japan . |
| 93/06052 | 4/1993 | WIPO ................... 65/104 |

Primary Examiner—Milton Cano
Attorney, Agent, or Firm—Oblon, Spivak, McClelland, Maier & Neustadt, P.C.

[57] ABSTRACT

A glass plate is cooled and strengthened by placing the glass plate on a cooling ring in a substantially horizontal state and jetting out cooling air at upper and lower sides of the glass plate by upper and lower cooling air jetting-out devices arranged at the upper and lower sides of glass plate. The pressure of cooling air jetting out from the lower side of the glass plate is higher than that from the upper side to thereby raise the glass plate against a contact ring located below the upper jetting out device.

8 Claims, 3 Drawing Sheets

METHOD OF AND APPARATUS FOR COOLING AND TEMPERING A GLASS PLATE

This application is a Continuation of application Ser. No. 08/282,432, filed on Jul. 29, 1994, now abandoned.

BACKGROUND OF THE INVENTION

FIELD OF THE INVENTION

The present invention relates to a method of and an apparatus for cooling and tempering a glass plate to prepare a tempered glass which is for various purposes of usage such as vehicles, ships, railways, aircrafts, buildings and so on.

DISCUSSION OF BACKGROUND

There has been known to support a peripheral portion of a glass plate by means of a support ring for pressing (hereinbelow, referred to as a press ring) when the glass heated to near the softening point in a furnace is bend-shaped by a forming mold. In such technique, a peripheral portion of the glass plate is pressed by the press ring and an upper mold having a downwardly convex configuration so that the glass plate is bend-shaped so as to correspond to the configuration of the upper mold. Thus, the peripheral portion of the glass plate can be bent to have a correct shape.

Further, there has been known a technique that a press ring on which a bend-shaped glass plate is supported is moved into a cooling device to rapidly cool and temper the glass plate.

However, in the conventional technique, there is a problem that cooling air stays between the glass plate and the press ring when the lower peripheral portion of the glass plate is supported by the press ring during rapidly cooling and tempering operations. Accordingly, it takes a time to cool the lower peripheral portion of the glass plate whereby a tensile stress undesirable to the strength of the glass plate takes place.

In order to eliminate the above-mentioned problem, there has been proposed to shape a press ring into a member having a discontinuous surface such as a comb-like material, but not a member having a continuous contacting surface. With use of the comb-like material, good ventilation of cooling air is obtainable between the press ring and the glass plate. However, since the press ring is shaped of the comb-like material, marks of projections of the comb-like material are impressed to the glass plate in the shaping operations.

U.S. Pat. No. 4,661,141 proposes an apparatus wherein a glass plate is pressed to a forming mold by means of a press ring made of a continuous material to form it; the formed glass plate is placed on a support ring for cooling (hereinbelow, referred to as a cooling ring) shaped of a discontinuous material so that the cooling ring supports a lower peripheral portion of the glass plate; the cooling ring with the glass plate is moved to a cooling device, and the glass plate is rapidly cooled and tempered.

The proposed apparatus had, however, problems as follows. Since the glass plate heated to about 640° C. or more is put on the cooling ring to support the lower peripheral portion of the glass plate, concave and convex portions of the cooling ring which is shaped of a discontinuous material come to contact with the lower surface of the glass plate which does not become rigid whereby marks of the concave and convex portions are resulted. Further, the glass plate is deformed due to its deadweight when it is transferred to the cooling device, and there is a sliding of the glass plate on the contacting surface of the cooling ring. The sliding of the glass plate brings about scratches on the glass plate due to the discontinuous structure of the cooling ring whereby the quality is deteriorated and the breaking of the glass plate may be caused at the time of rapidly cooling and tempering.

In order to overcome the above-mentioned problem, Japanese Unexamined Patent Publication No. 145041/1982 and Japanese Unexamined Utility Model Publication No. 157939/1987 propose an apparatus having a double structure composed of a press ring and a cooling ring for effecting forming and cooling operations continuously. The apparatus disclosed in Japanese Unexamined Patent Publication No. 145041/1982 is so constructed that a press ring made of a continuous material is disposed to receive a lower peripheral portion of a glass plate and a cooling ring shaped of a discontinuous material is arranged inside the press ring. In the forming operations, the lower peripheral portion of the glass plate is supported by the press ring, and the press ring is raised to push the glass plate to an upper mold, whereby the glass plate is formed. Then, the formed glass plate whose lower peripheral portion is supported by the press ring is transferred to a cooling device. In the cooling device, the cooling ring arranged inside the press ring which supports the glass plate, is projected upwardly to thereby support an inner side of the lower peripheral portion of the glass plate. Then, the glass plate is rapidly cooled and tempered in that state. In this cooling method, however, since the glass plate is cooled while the inner side of the lower peripheral portion of the glass plate is supported by the cooling ring shaped of the discontinuous material such as a comb-like material, there arises a problem that marks of the comb-like cooling ring take place on the inner side of the lower peripheral portion of the glass plate. Further, the glass plate is cooled in a state that the inner side of the lower peripheral portion of the glass plate is supported by the cooling ring. Therefore, the outer peripheral portion of the lower surface of the glass plate is not supported. As a result, accuracy in shape of the peripheral portion of the glass plate is decreased and variation in the shape of the glass plate is large.

On the other hand, the apparatus disclosed in Japanese Unexamined Utility Model Application No. 157939/1987 is so constructed that a cooling ring shaped of a discontinuous material is disposed to receive a lower peripheral portion of the glass plate and a press ring made of a continuous material is arranged inside the cooling ring. In forming operations, the press ring supports the inner side of the lower peripheral portion of the glass plate, and the press ring is raised to an upper mold and press the glass plate to the upper mold for forming. After the forming, the glass plate is transferred to a cooling device. In the cooling device, the cooling ring supports the lower peripheral portion of the glass plate instead of the press ring supporting the inner side of the lower peripheral portion of the glass plate, and the glass plate is rapidly cooled and tempered.

In the above-mentioned apparatus, however, the glass plate is pressed to the forming mold while the inner side of the lower peripheral portion of the glass plate is supported by the press ring. Accordingly, the peripheral portion of the glass plate cannot be in close-contact with the forming mold. As a result, the shape of the forming mold is not sufficiently transferred to the glass plate resulting in a failure of the forming of the peripheral portion of the glass plate. Further, there is another problem that marks of contacting portions of the press ring take place at the inner side of the lower peripheral portion of the glass plate.

In either method of the above-mentioned, the forming and the cooling of the glass plate are conducted while the lower surface of the glass plate is supported by the cooling ring or the press ring. Accordingly, marks are resulted in the glass plate at the contacting portions of the cooling ring. Or scratches take place on the lower surface (i.e. the outer surface of the glass when attached to a vehicle) of the glass plate due to the sliding of the glass when the glass plate in a non-rigid state is deformed. In a tempered glass plate for a vehicle, in particular, a mark of the support ring in the glass plate at a portion which cannot be hidden with a mold decreases the quality.

Recently, there is a demand of mold-less glass plate wherein the peripheral portion of the glass plate is not attached with a mold. The glass plate produced by the conventional method wherein a mark of the support ring is produced at a peripheral portion of the glass plate can not satisfy the demand.

SUMMARY OF THE INVENTION

It is an object of the present invention to provide a method of and apparatus for rapidly cooling and tempering a glass plate which eliminate a mark of the support ring produced at a peripheral portion of a glass plate; increase accuracy and the strength of a formed product; allows effective working from forming operations and cooling operations of the glass plate, and minimize a scratch and breaking by heat from the support ring.

In accordance with the present invention, there is provided a method of rapidly cooling and tempering a glass plate which comprises:

placing a glass plate to be rapidly cooled and tempered in a substantially horizontal state;

arranging upper and lower cooling air jetting-out devices at the upper and the lower sides of the glass plate; and jetting out cooling air from the upper and the lower cooling air jetting out devices to the glass plate, wherein the pressure of cooling air jetted out from the lower side of the glass plate is higher than that from the upper side to thereby raise the glass plate by the pressure difference between the cooling air from the upper and the lower sides of the glass plate, whereby the glass plate is rapidly cooled and tempered.

Further, in accordance with the present invention, there is provided an apparatus for rapidly cooling and tempering a glass plate which comprises:

an upper cooling air jetting-out device, a lower cooling air jetting-out device, and a support ring for cooling for transferring a glass plate between the upper and the lower cooling air jetting-out devices, wherein the pressure of cooling air from the lower cooling air jetting-out device is higher than the pressure of cooling air from the upper cooling air jetting-out device.

In accordance with the present invention, there is provided an apparatus for rapidly cooling and tempering a glass plate characterized in that a contact ring for supporting a glass plate from the upper side in a cooling operation for the glass plate is arranged facing cooling air jetting-out apertures of an upper cooling device in a pair of vertically arranged cooling devices each having a plurality of cooling air jetting-out apertures; the glass plate is raised by the pressure difference of cooling air jetted-out from the cooling devices, and the glass plate is cooled while an upper peripheral portion of the glass plate is in contact with the contact ring attached to the upper cooling device.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
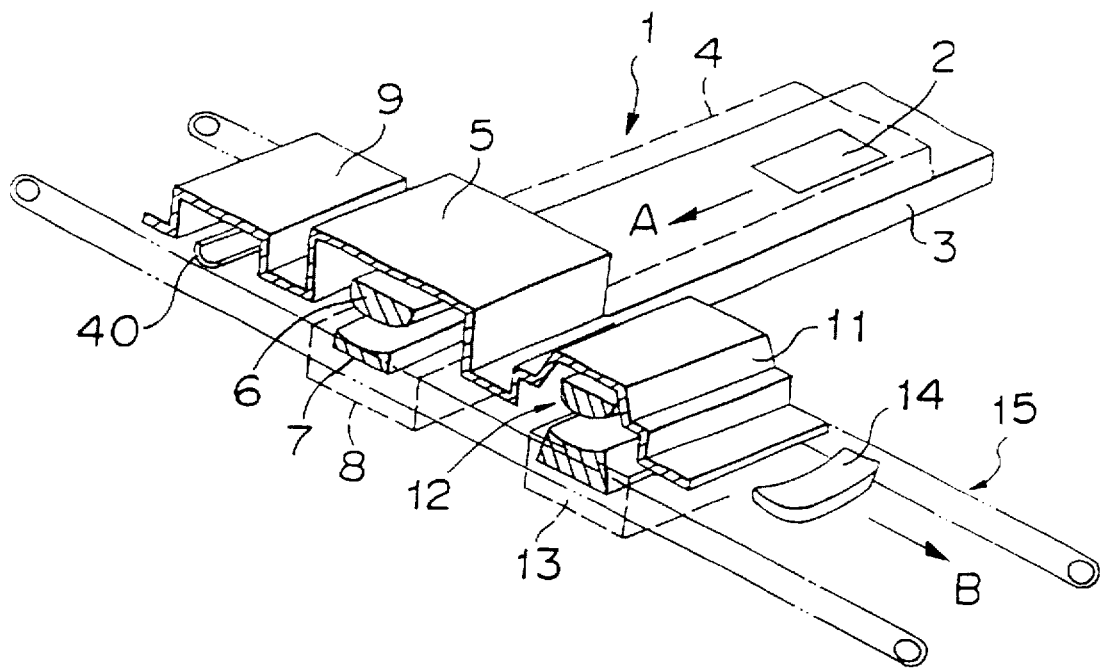
FIG. 1 is a schematic view showing an embodiment of an apparatus for shaping and cooling a glass plate according to the present invention.

Referring to the drawings wherein the same reference numerals designate the same or corresponding parts, there is shown FIG. 1 illustrating an embodiment of a forming and cooling structure including a rapidly cooling and tempering apparatus for a glass plate according to the present invention.

A glass plate forming and cooling apparatus 1 has a transferring means 3 such as a conveyor, rollers or the like for transferring a glass plate 2 to be formed. The glass plate transferring surface side of the transferring means 3 is covered by a heating zone roof 4 for keeping the transferring surface side to a high temperature. The glass plate heated to the glass softening point is transferred by the transferring means 3 along an arrow mark A to a forming zone 5.

In the forming zone 5, there is a forming mold consisting of an upper mold 6 and a lower mold 7. In the lower mold 7, a plurality of slits having a comb-like shape in cross section are formed, and glass plate transferring rollers (not shown) which are vertically movable are provided in the lower mold 7. Further, in the forming zone 5, various types of controlling means 8 including a device for vertically moving the upper mold and/or the lower mold 7, means for raising and lowering the transferring rollers, a vacuum driving means such as a vacuum suction means (not shown) provided on the upper mold 6 are disposed.

A ring heating zone 9 is provided adjoining the forming zone 5. The ring heating zone 9 receives therein a press ring 40 for supporting the glass plate 2 from the bottom to press it to the upper mold 6 in forming operations. The ring heating zone 9 is heated to a predetermined temperature in the forming operations.

Figure 2:
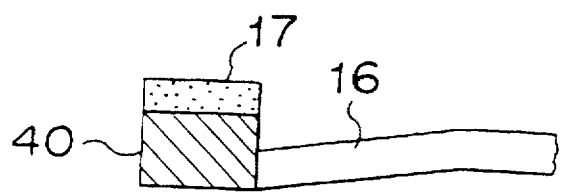
FIG. 2 is a cross-sectional view partly omitted of a support ring for supporting the glass plate used for the present invention.

As shown in FIG. 2, a heat insulating cloth 17 having elasticity is attached to the upper surface of the press ring 40. A supporting member 16 is extended at the outer circumferential side of the press ring 40 for supporting the ring 40 and helping the transferring operations of it. The heat insulating cloth 17 is to prevent the glass plate in the forming operations from occurring a crack due to strain when the glass plate 2 is brought to contact with the press ring 40. Further, it prevents occurrence of marks of contacting portions of the ring 40 in the glass plate 2 heated to about 640°

C. or more, which may result at the time of pressing the softened glass plate with the ring 40 made of a hard material such as metal.

Figure 3:
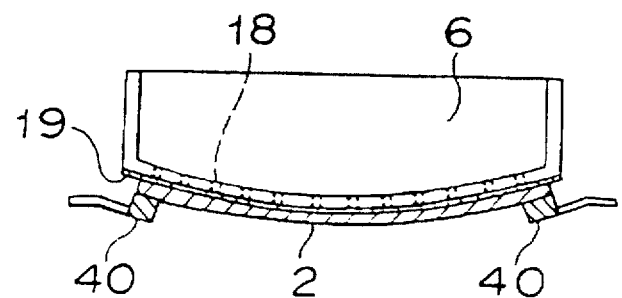
FIG. 3 is a cross-sectional view showing a state of the glass plate pressed to an upper forming mold.

As shown in FIG. 3, the glass plate 2 whose peripheral portion is supported by the press ring 40 is pressed to the upper mold 6. Vacuum suction ports 18 are formed in the forming surface (lower surface) of the upper mold 6 whereby the glass plate 2 is sucked and held by means of a vacuum device (not shown) via a further insulating cloth 19. Bending and forming operations for the glass plate 2 are conducted firstly by press-forming the glass plate 2 with the upper and lower molds 6, 7, and then, subjecting a peripheral portion of the glass plate 2 to deep bend-forming. In this case, a peripheral portion of the glass plate 2 may be pressed to the upper mold 6 by using the press ring 40, or the peripheral portion of the glass plate 2 may be pressed to the upper mold by means of the press ring 40 without the press-forming operation by using the upper and lower molds.

A cooling zone 11 is provided adjacent to the forming zone 5 at the opposite side of the heating zone 9 with respect to the forming zone 5. In the cooling zone 11, a cooling air jetting-out device 12 consisting of an upper cooling device and a lower cooling device is provided. At the side of a cooling air jetting-out surface (the upper surface side) of the lower cooling device, slits (not shown) are formed in the same manner as those of the lower mold 7. Further, glass plate transferring rollers (not shown) may be disposed in the slits so as to vertically movable. The cooling zone 11 has a cooling air jetting-out controlling means, and a drive controlling means 13 including an elevating mechanism for raising the glass plate transferring rollers as necessary.

The glass plate is rapidly cooled and tempered in the cooling zone 11 thereby becoming a tempered glass plate 14. The glass plate 14 is transferred in the direction of an arrow mark B to the next step by means of a transferring device 15. The transferring device 15 is so adapted to continuously transfer the press ring 40 supporting the glass plate 14 from the heating zone 9 through the forming zone 5 to the cooling zone 11. In this case, driving means for transfer such as a driving chain may be disposed-continuously from the heating zone 9 to the cooling zone 11, or a plurality of driving means may be disposed so that they can deliver the press ring 40 in each of the zones.

Figure 4:
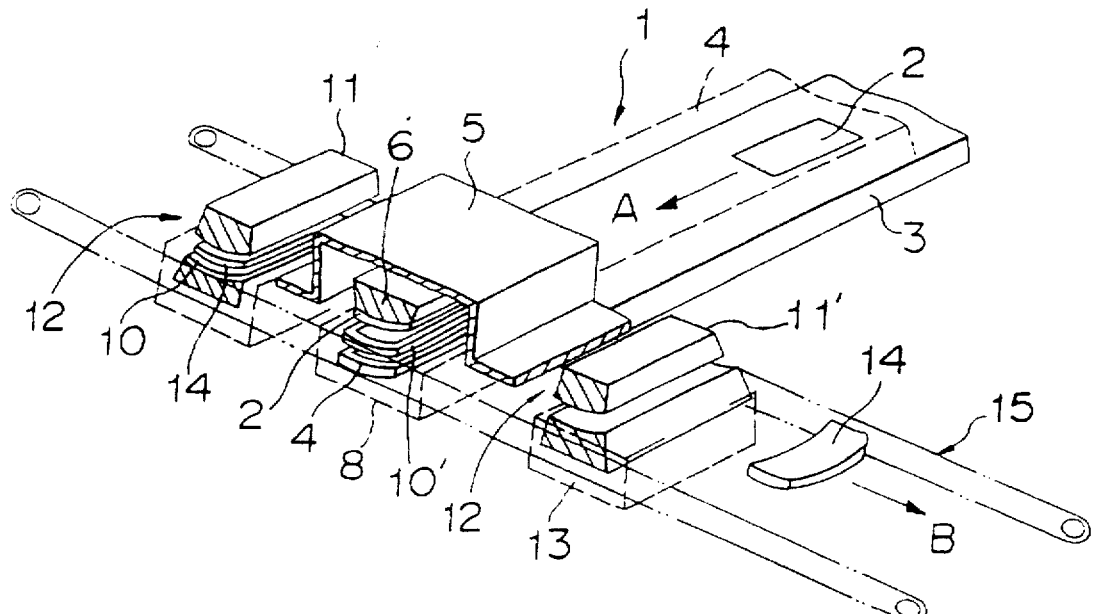
FIG. 4 is a schematic view showing a cooling device used for the present invention.

FIG. 4 is a diagram showing another embodiment of the forming and cooling apparatus including the rapidly cooling and tempering device of a glass plate according to the present invention wherein the same reference numerals as the first embodiment designate the same or corresponding part, and accordingly, description of these parts is omitted.

The upper mold 6 is disposed at the upper portion in the forming zone 5. The press ring 40 for supporting the glass plate 2 and pressing it to the upper mold 6 in the forming operations is disposed below the upper mold 6. The press ring 40 can be elevated to the upper mold 6 from the lower portion of the transferring means 3 so that the glass plate 2 on the transferring means 3 is pressed to the upper mold 6. In this case, it is preferable that the press ring 40 is previously heated to a glass softening temperature (about 640° C. or more) at a lower waiting position. Thus, occurrence of a crack due to a thermal stress when the glass plate 2 is brought to contact with the press ring 40 in the forming operations, can be prevented. Further, when the press ring 40 is made of a hard material such as rigid metal or the like, the contacting surface may be finished to have a mirror surface whereby marks of contacting portions of the press ring 40 are prevented from occurring in the softened glass plate when the press ring 40 is brought into contact with the glass plate 2.

As shown in FIG. 3, the glass plate 2 whose peripheral portion is supported by the press ring 40 is pressed to the upper mold 6. Then, the glass plate 2 is sucked and held by the upper mold 6. Then, the press ring 40 is lowered downwardly. Then, a cooling ring 10 is moved from the cooling zone 11 to a lower position of the upper mold. The glass plate 2 is placed on the cooling ring 10, and the cooling ring 10 is transferred to the cooling zone 11 where the glass plate 2 is rapidly cooled and tempered to thereby become the tempered glass plate 14. The tempered glass plate 14 is transferred in the direction of the arrow mark B to the next step by means of the transferring device 15. In this embodiment, it is preferable to attach a felt-like elastic heat insulating cloth made of an insulating material such as stainless steel, aromatic polyamide or the like onto the surface of the cooling ring 10. The provision of the elastic heat insulating cloth can prevent the occurrence of marks of contacting portions of the cooling ring 10 when the ring 10 is brought to contact with the glass plate 2.

As shown in FIG. 4, it is preferable to arrange a pair of cooling zones 11, 11' at both sides of the forming zone 5. Such construction allows cooling rings 10, 10' to alternately advance to and retract from the left and right sides of the forming zone 5 wherein when either ring is in the cooling zone, the other receives the glass plate 2 from the upper mold 6 in the forming zone. The construction reduces the length of a tact.

Figure 5:
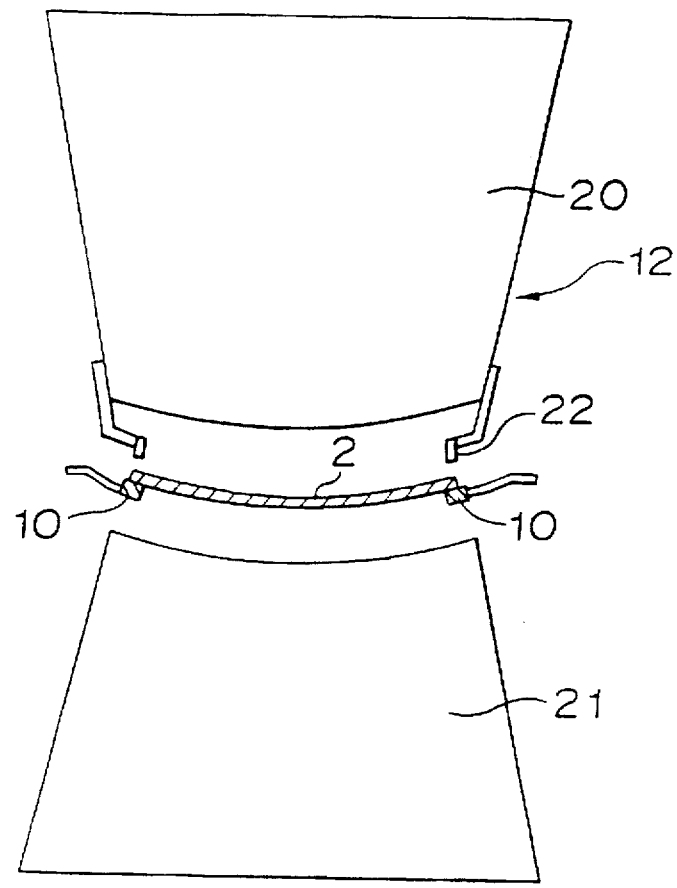
FIG. 5 is a schematic view showing an embodiment of an apparatus for forming and cooling the glass plate according to the present invention.

FIG. 5 shows an embodiment of the construction of the cooling air jetting-out device 12 according to the present invention. An upper cooling device 20 and a lower cooling device 21 are arranged in opposing positions with respective air jetting-out surfaces provided with a plurality of cooling air jetting-out openings (not shown) facing each other. Cooling air forcibly supplied from a blower or an accumulator (not shown) is blasted from the upper and lower directions. The bend-shaped glass plate 2 supported by the cooling ring 10 is transferred between the upper and lower cooling devices 20, 21, and then, cooling air is blasted from the upper and lower directions by the cooling devices 20, 21. In this case, the pressure of the cooling air jetted out from the lower cooling device 21 is made higher than the pressure of the cooling air jetted out from the upper cooling device to thereby provide the pressure difference of cooling air. As a result, the glass plate 2 can be raised from the cooling ring 10.

The upper cooling device 20 has, at its cooling air jetting-out surface side (the lower surface side), a contact ring 22 having a shape corresponding to the outer periphery of the glass plate 2. The glass plate 2 raised from the cooling ring 10 due to the pressure difference of cooling air jetted out from the upper and lower cooling devices 20, 21, hits contact ring 22 at its outer peripheral portion of upper surface. Thus, the glass plate 2 is held in a state of contacting to the ring 22 due to a dominant air pressure from the lower side.

Figure 6:
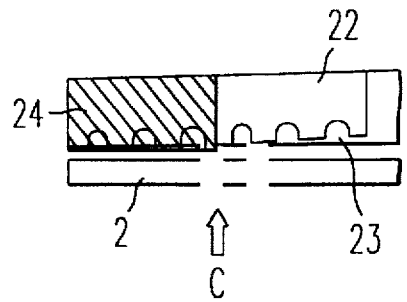
FIG. 6 is a schematic view showing a construction of a contact ring used for the present invention.

As shown in FIG. 6, the lower surface of the contact ring 22 to which the glass plate 2 contacts has a discontinuous structure having a comb-like shape wherein there are a series of cut portions 23 and the top of each tooth between the cut portions is flat. Further, it is preferable to dispose a net material 24 to cover the tooth tops of the comb-like structure. With such construction, cooling air communicates through the cut portions and the glass-plate-contacting surface of the contact ring 22 whereby a cooling effect can be increased. Further, when the glass plate 2 is pushed to the contact ring 22 from the direction as indicated by a letter C, the occurrence of marks of contacting portions of the contact ring 22 in the glass plate 2 can be minimized. Further, at least one of the upper cooling device 20, the lower cooling device 21, and the contact ring 22 is preferably provided with a driving means which slides the glass plate 2 in the horizontal direction in the cooling operations. Then, a cooling effect can be increased.

Figure 7:
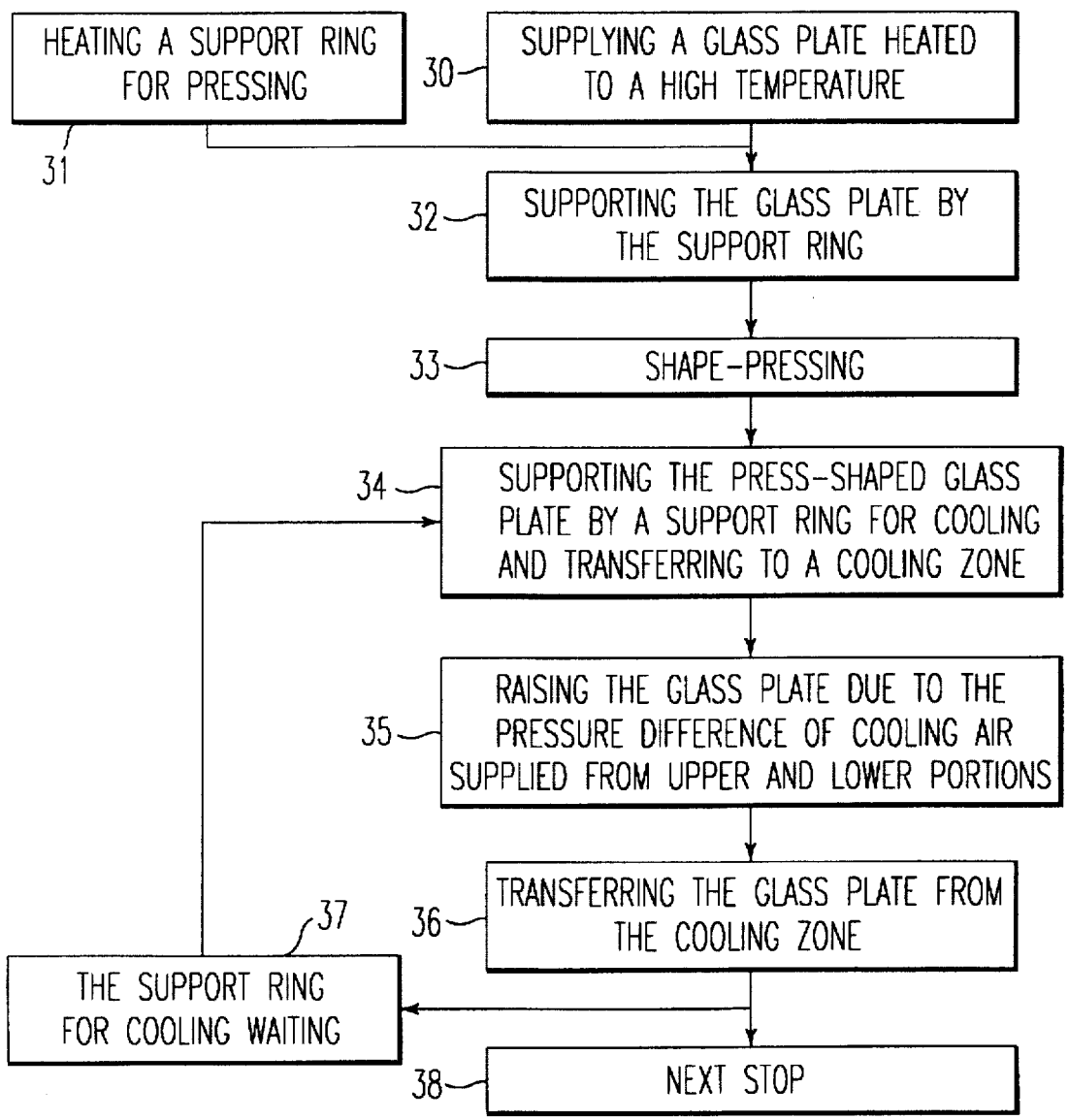
FIG. 7 is a flow chart showing an example of rapidly cooling and tempering processes for a glass plate according to the present invention.

The treatment of the glass plate with use of the rapidly cooling and tempering apparatus having the above-mentioned construction will be described with reference to FIG. 7.

First of all, at Step 30, the glass plate 2 heated to nearly the softening point in a heating furnace such as a roller hearth, gas hearth or the like is transferred to the forming zone 5 in the direction indicated by the arrow mark A (FIG. 4). In this case, the press ring 40 waiting for the glass plate 2 at a lower position in the forming zone 5 is heated to a predetermined temperature (Step 31).

In the forming zone 5, the lower peripheral portion of the glass plate 2 is supported by the press ring 40 (Step 32). Then, the press ring 40 is raised to press the glass plate 2 to the upper mold 6 to thereby conduct shape-pressing (Step 33). At the same time, air in the upper mold 6 is drawn into a vacuum so that the glass plate 2 is certainly in close-contact with the suction surface of the upper mold 6.

After the forming operations, the press ring 40 is lowered. Under the condition that the glass plate 2 is sucked to and held by the upper mold 6, the cooling ring 10 is moved from the cooling zone 11 to the forming zone 5. In the forming zone, the glass plate 2 sucked to and held by the upper mold 6 is transferred onto the cooling ring 10. Further, the glass plate 2 is transferred to the cooling zone 11 while the glass plate 2 is supported by the cooling ring 10 (Step 34). The glass plate is moved between the upper and the lower cooling devices 20, 21 (FIG. 5). Cooling air is jetted out from the upper and the lower cooling devices 20, 21 so that the glass plate 2 is raised from the support ring due to the pressure difference of cooling air jetted out from the upper and the lower cooling devices, whereby the upper peripheral portion of the glass plate is pushed to the contact ring 22 (Step 35). Thus, the glass plate is cooled from the upper and lower directions and tempered in a state that the upper surface of the glass plate is brought into contact with the contact ring 22.

In the cooling operations, when the upper peripheral portion of the glass plate is pushed to the contact ring 22 and if the pressure difference of cooling air jetted out from the upper and the lower cooling devices is excessively large, there is a danger of the deformation of the glass plate owing to a large pushing force at the cooling time. Further, a clear mark of the contacting portion of the contact ring is marked in the glass plate. On the contrary, when the pressure difference is too small, it is impossible to push the glass plate to the contact ring in the cooling operations, and accuracy of the shape of the peripheral portion of the glass plate is decreased. Accordingly, it is preferable that the pressure difference of cooling air jetted out from the upper and the lower cooling devices 20, 21 is in a range of 100 mm–500 mm (water gauge) although it depends on the shape and the thickness of the glass plate.

Thus, the rapidly cooled and tempered glass plate is taken out from the cooling zone (Step 36). In this case, the pressure difference of cooling air may gradually be minimized so that the glass plate can be smoothly placed on the cooling ring which is at a lower waiting position. Or, the cooling ring may be raised to support the lower surface of the plate before the cooling air is stopped, the cooling ring being lowered with the glass plate.

It is preferable to install another transferring means in the cooling zone in order to transfer the glass plate to the next step of the cooling step. In this case, the cooling ring can be moved to the forming zone. This can be shorten a tact. The glass plate taken out from the cooling zone is transferred to the next step for another treatment (Step 38). On the other hand, the cooling ring 10 is at a waiting position (Step 37), and it is moved to receive the glass plate after the next glass plate is formed in the forming zone (FIG. 4).

According to the present invention, the bend-shaped glass plate is cooled while it is raised. Accordingly, cooling air can be supplied substantially uniformly to the entire surfaces of the glass plate. Accordingly, a cooling effect can be increased and occurrence of marks by a supporting member can be minimized. Further, since the upper surface side (an inwardly curved surface side) of the glass plate is brought to contact with and held by a contact ring when the glass plate is raised, a mark which might be formed in the glass plate is at the inwardly curved surface side of the glass plate.

Accordingly, when the glass plate is used as a window glass for a vehicle, the mark is at the cabin side of the vehicle, and therefore, there is no problem of appearance.

Further, the glass plate is cooled while the upper peripheral portion of the glass plate is supported by the contact ring having a discontinuous structure. Accordingly, a possibility of occurrence of the mark by the contact ring can be minimized since there is no stagnation of cooling air by the presence of the contact ring. An efficient cooling function of the glass plate is obtainable even in an edge portion of the glass plate. Further, accuracy in the shape of the peripheral portion of the glass plate can be improved. The above-mentioned advantage is in particular effective when the glass plate is used for a tempered glass without a mole for a vehicle.

In the present invention, the magnitude of the pressure of cooling air jetted out from the upper and the lower cooling devices can be changed at an optional timing. Accordingly, -the glass plate can be raised at a predetermined timing after the surface of the glass plate is rapidly cooled to a certain extent, whereby the glass plate is rapidly cooled and tempered without causing the deformation of the glass plate due to the pressure difference of the cooling air for raising the glass plate.

Obviously, numerous modifications and variations of the present invention are possible in light of the above teachings. It is therefore to be understood that within the scope of the appended claims, the invention may be practiced otherwise than as specifically described herein.

What is claimed is:

1. A method of cooling and tempering a glass plate, the method comprising the steps of:

placing a glass plate to be cooled and tempered in a substantially horizontal state on a cooling support ring;

arranging upper and lower cooling air jetting-out devices at upper and lower sides of the glass plate; and jetting out cooling air from the upper cooling air jetting out device in a downward direction toward an upwardly facing surface of the glass plate, and from the lower cooling air jetting out device in an upward direction toward a downwardly facing surface of the glass plate, wherein the pressure of cooling air jetted out from the lower cooling air jetting out device is higher than that from the upper cooling air jetting out device to thereby raise the glass plate from the cooling support ring, caused by the pressure difference between the cooling air from the upper and the lower cooling air jetting out devices, upwardly pressing a peripheral portion of the glass plate against a contact ring having a shape corresponding to the peripheral portion of the glass plate and disposed at a side, facing the glass plate, of the upper cooling air jetting-out device so as to maintain a distance between the upwardly facing surface of the glass plate and a lower surface of the upper cooling air jetting-out device, to thereby cool and temper the glass plate under a condition that the glass plate is raised against the contact ring and said distance is kept between the glass plate and the upper cooling air jetting-out device.

2. The method of cooling and tempering a glass plate according to claim 1, wherein the glass plate is cooled while the pressure difference of cooling air from the upper and the lower cooling air letting out devices is given to the glass plate so as not to raise it, and then, at least one of the pressures of cooling air from the upper and the lower cooling air jetting out devices is changed so that the pressure of cooling air from the lower cooling air jetting out device is higher than that from the upper cooling air letting out device, whereby the glass plate is further cooled in a state that the glass plate is raised by the pressure difference between the cooling air from the upper and the lower cooling air jetting out devices.

3. The method of cooling and tempering a glass plate according to claim 1, wherein an upper mold having a sucking and holding function to the glass plate and a support ring for pressing are used for bending the glass plate;

a lower peripheral portion of the glass plate is supported by the support ring;

the glass plate is bend-shaped by raising the support ring to the upper mold;

the glass plate is sucked and held by the upper mold;

the support ring is removed from the glass plate;

the cooling support ring for cooling is moved to a lower position of the upper mold, and receives the glass plate from the upper mold;

the cooling support ring receiving thereon the glass plate is moved between the upper and the lower cooling air jetting out devices; and the glass plate is raised from the cooling support ring by the pressure difference between the pressures of cooling air from the upper and the lower cooling air jetting out devices.

4. The method of cooling and tempering a glass plate according to claim 3, wherein the glass plate is cooled while the pressure difference of cooling air from the upper and the lower cooling air jetting out devices is given to the glass plate so as not to raise it, and then, at least one of the pressures of cooling air from the upper and the lower cooling air jetting out devices is changed so that the pressure of cooling air from the lower cooling air jetting out device is higher than that from the upper cooling air jetting out device, whereby the glass plate is further cooled in a state that the glass plate is raised by the pressure difference between the cooling air from the upper and the lower cooling air jetting out devices.

5. An apparatus for cooling and tempering a glass plate, the apparatus comprising:

an upper cooling air jetting-out device for downwardly directing cooling air to an upwardly facing surface of a glass plate;

a lower cooling air jetting-out device for upwardly directing cooling air to a downwardly facing surface of the glass plate;

a cooling support ring for transferring a glass plate between the upper and the lower cooling air jetting-out devices, wherein a pressure of cooling air from the lower cooling air jetting-out device is higher than a pressure of cooling air from the upper cooling air jetting-out device; and a contact ring attached to the upper cooling air jetting-out device for spacing the glass plate from a lower surface of the upper cooling air jetting-out device when an upper peripheral portion of the glass plate comes into contact with the contact ring due to the pressure difference between the cooling air from the upper and the lower cooling air jetting-out devices which raises the glass plate from the cooling support ring and against the contact ring.

6. The apparatus for cooling and tempering a glass plate according to claim 5, wherein the upper and the lower cooling air jetting-out devices are adapted to change at an optional timing the pressure of cooling air jetted out.

7. The apparatus for rapidly cooling and tempering a glass plate according to claim 5, which further comprises:

an upper mold for sucking and holding the glass plate; anal a support ring for pressing which is capable of supporting a lower peripheral portion of the glass plate and is disposed below the upper mold so as to be raised and lowered and which presses and bends the glass plate at a raised position in association with the upper mold;

said cooling support ring being adapted to receive the glass plate sucked and held by the upper mold after the support ring has been removed, and to transfer the glass plate between the upper and the lower cooling air jetting-out devices.

8. The apparatus for cooling and tempering a glass plate according to claim 7, wherein the upper and the lower cooling air jetting-out devices are adapted to change at an optional timing the pressure of cooling air jetted out.

* * * * *